July 6, 1926. 1,591,867
J. F. WATSON
COVER OR CASING FOR JOINTS IN ELECTRIC CABLES
Filed Nov. 24, 1924 2 Sheets-Sheet 2
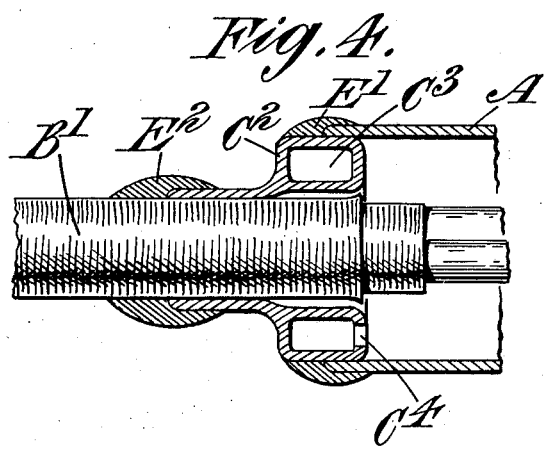
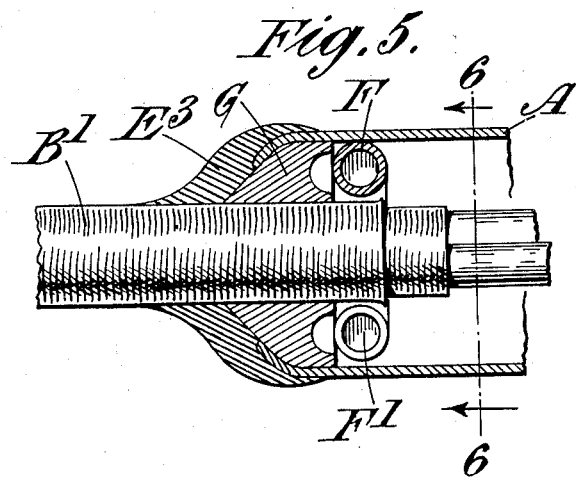 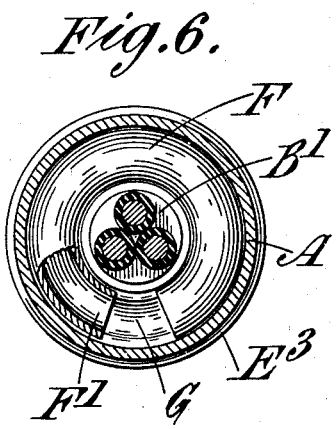

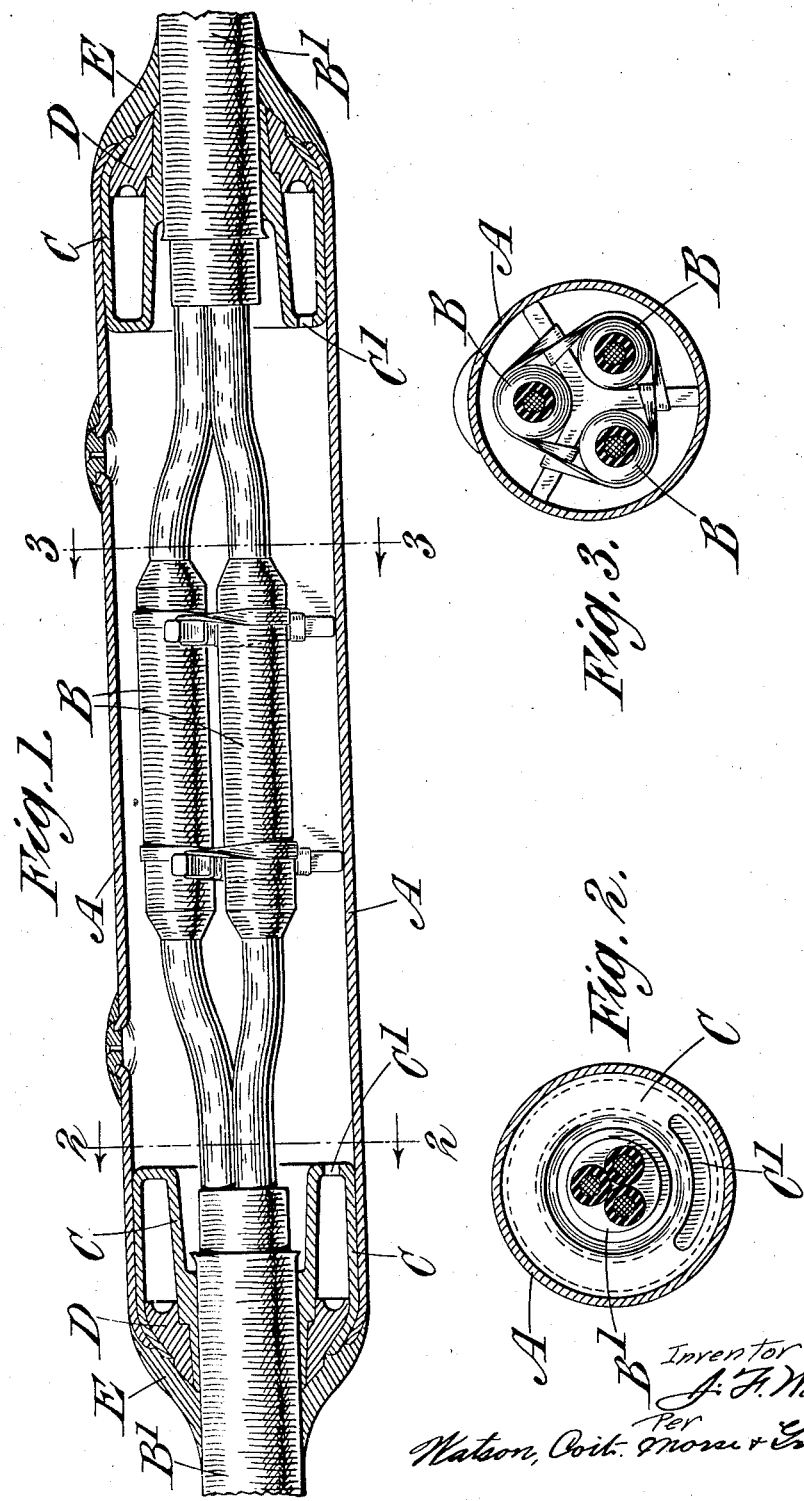

Patented July 6, 1926.

1,591,867

UNITED STATES PATENT OFFICE.

JOHN FRANCIS WATSON, OF ABBEY WOOD, ENGLAND.

COVER OR CASING FOR JOINTS IN ELECTRIC CABLES.

Application filed November 24, 1924, Serial No. 752,042, and in Great Britain January 14, 1924.

This invention relates to the covers or casings for joints in electric cables and has particular reference to those which are used for enclosing straight-through joints in high tension and extra high tension cables.

It is known practice to use as such a cover a lead or other tube enclosing the insulated joint or joints, this tube being supported by end rings and secured by wiped joints to the lead sheathing of the cables. Various forms of cast iron or other boxes are also used. Usually all such covers or boxes are filled up with some suitable insulating compound.

Cables for high tension and extra high tension work need to be very thoroughly impregnated so that there are no air spaces in the insulating material and provision should be made for expansion of the impregnating compound in the cables and in the covers or casings due to rise of temperature. This question becomes of great importance when as is often the case the "duty" of the conductor is increased as compared with standards formerly adopted.

When cast iron or other more or less box-like casings are used provision for expansion can be and has been made by means of domes formed in the boxes and enclosing air spaces.

The object of the present invention is to provide adequately for such expansion in a tubular cover which in itself may be simply a length of tube say for example of drawn lead, without incurring the increased cost and other disadvantages of forming domes in or otherwise specially constructing the tube itself.

This is accomplished according to the present invention by employing within the cover a member forming a chamber or pocket in which air is entrapped by the compound filled into the cover, this air forming a cushion allowing for the change of volume due to variations of temperature during working.

The invention may be carried out in various ways. For instance the tubular cover may contain near one or both ends an annular hollow member closed except for an opening through which the liquefied filling compound passes until compression of the air inside the member prevents the entry of more compound.

In one construction the annular member forms the end ring supporting the tubular cover and is conveniently made of a casting say of lead, open at its outer end and closed except for a small hole at its inner end. The inside of this member fits on to the external lead sheath of the cable and its outer surface supports the end of the tubular cover. A gland or ring is inserted to close the outer end of the annular air chamber in the member and a wiped joint is made sealing hermetically the ends of the tubular cover, the annular member and the gland ring with the lead sheath of the cable.

Whatever the construction employed the air pocket or expansion chamber is at some point within the cover remote from the place where the joint or joints are situated so that there is no risk of the entrapped air gaining access to the conductor or to the impregnated paper or other insulating material surrounding it.

From the foregoing description it will be appreciated that the tubular cover or casing itself may be simply a length of drawn pipe involving no special construction and further that its dimensions may be simply those of an ordinary joint cover unprovided with any provision for expansion, such dimensions being determined mainly by the space required to accommodate the joints within the cover.

In the accompanying drawings:—

Figure 1 is a longitudinal central section through one construction of cover or casing according to this invention, Figures 2 and 3 are cross sections on the lines 2—2 and 3—3 respectively, Figure 4 is a longitudinal section of one end of a modified construction of cover according to this invention, Figure 5 is a view similar to Figure 4 illustrating another construction also according to this invention, and Figure 6 is a cross section on the lines 6—6 of Figure 5.

With reference first to Figures 1, 2 and 3 A is a tube say of drawn lead enclosing joints B in a three-core cable. These joints are supported as shown in Figure 3 but as this is a wellknown method of supporting such joints in a tubular cover it is not described in detail.

Each end of the tube A is supported on a hollow annular member C which may be for instance a lead casing. The outer end of this annular member is closed by a gland or ring D and the tube A, annular member C, ring D and lead cable-covering B¹ are all secured and sealed by a wiped joint as at E.

The inner end of the annular member C is closed except for an opening C¹ through which the liquefied filling compound can pass until the compression of the entrapped air prevents the entrance of further compound.

In the construction illustrated in Figure 4 the hollow annular member C² is of slightly different construction from the member C of Figure 1. It is formed initially with an annular space C³ entirely closed except for an opening C⁴ which may correspond to the opening C¹ of Figure 1. Thus the gland or closing ring D of Figure 1 is dispensed with. In this construction the cover is formed with two wiped joints one at E¹ between the tube A and the supporting member C² and the other at E² between the neck of the supporting member and the lead covering B¹ of the cable.

In the construction shown in Figures 5 and 6 the space for the entrapped air is provided by a hollow member F which does not form part of the end ring supporting the tube A as in the constructions previously described but is a separate member contained within the tube A near its end. This member F may be as shown in Figure 6, a ring of metal tubing cut so as to have two open ends of which one is indicated at F¹. The tube is shown as of circular cross section but a rectangular or other section may be used. When the separate member is employed the end of the tube A is supported on an end ring G each of those members being secured to the lead cable-covering B¹ by a wiped joint as at E².

What I claim as my invention and desire to secure by Letters Patent is:—

1. The combination with a tubular cover for an electric cable joint of a hollow member within the tubular cover, such hollow member being closed except for an opening through which the liquefied filling compound passes until compression of the air inside prevents the entry of more compound.

2. In a cover for an electric cable joint the combination of a tubular cover and a hollow member forming a supporting ring between the end of the cover and the cable such hollow member being closed except for an opening through which the liquefied filling compound passes until compression of the air inside the hollow member prevents the entry of more compound.

In testimony whereof I have signed my name to this specification.

JOHN FRANCIS WATSON.